W. TATHAM.
MEANS FOR AUTOMATICALLY RECORDING IN THE TAXIMETER EXTRA FARES IN TAXICABS.
APPLICATION FILED MAY 23, 1912.
1,060,144.
Patented Apr. 29, 1913.
2 SHEETS—SHEET 1.
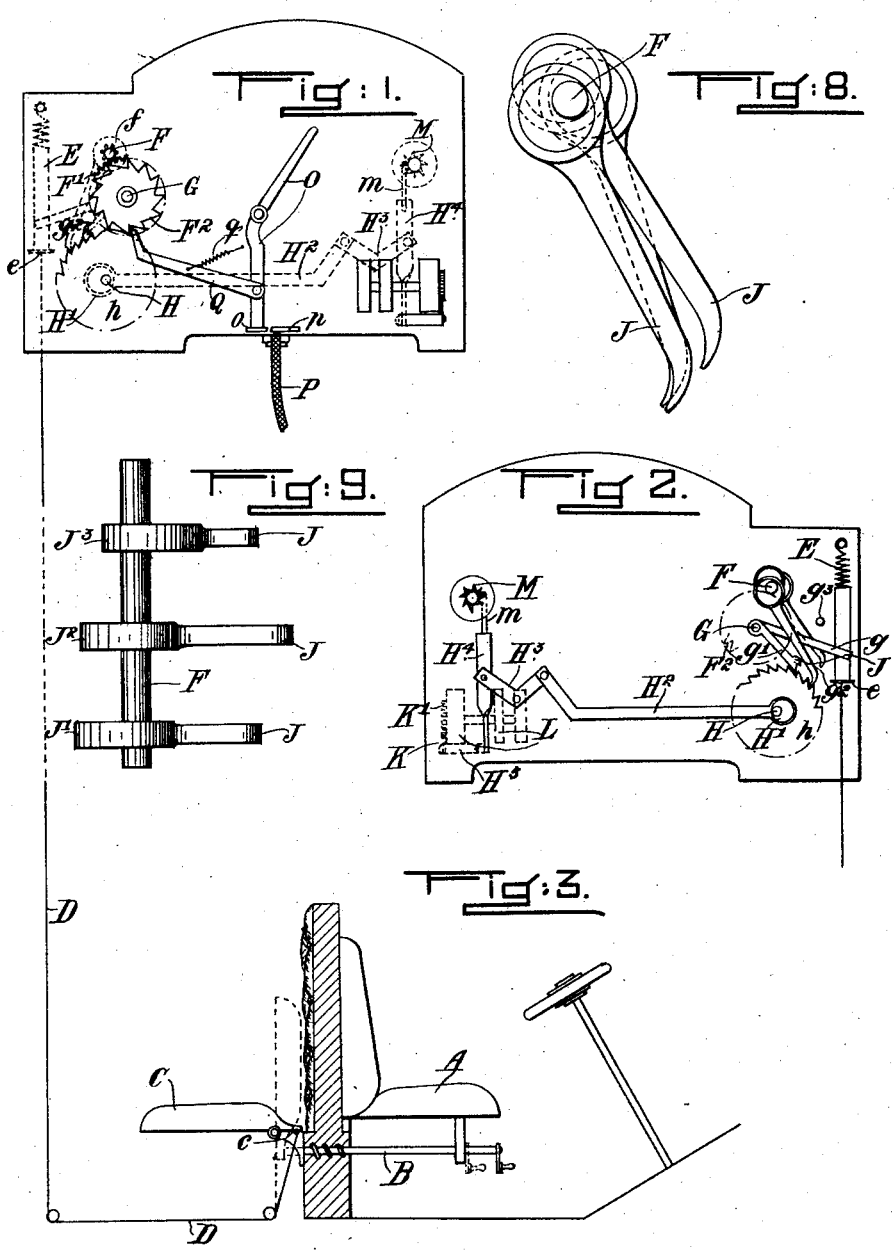
WITNESSES:
John C. Sanders
Albert F. Heuman
INVENTOR:
William Tatham
By Wm. Wallace White
ATTY.

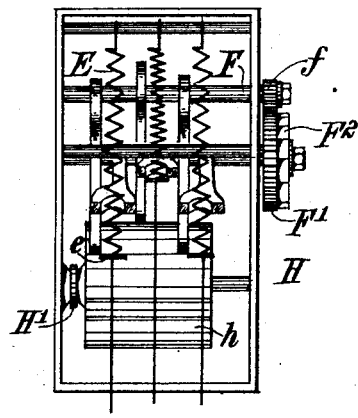
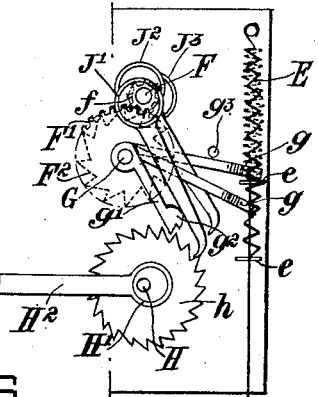
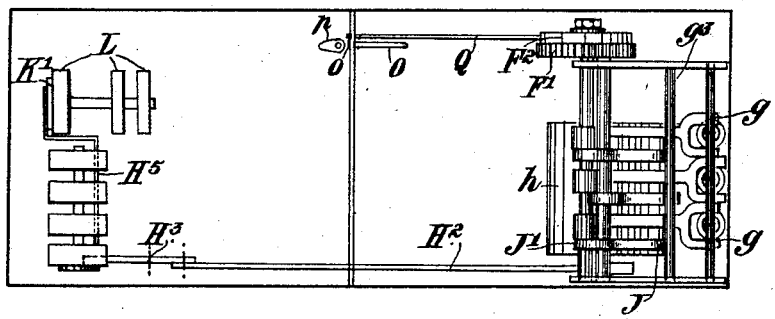
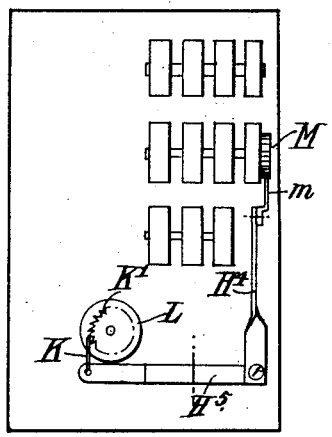

UNITED STATES PATENT OFFICE.

WILLIAM TATHAM, OF WOOLLAHRA, NEW SOUTH WALES, AUSTRALIA.

MEANS FOR AUTOMATICALLY RECORDING IN THE TAXIMETER EXTRA FARES IN TAXICABS.

1,060,144.  Specification of Letters Patent.  Patented Apr. 29, 1913.

Application filed May 23, 1912. Serial No. 699,179.

*To all whom it may concern:*

Be it known that I, WILLIAM TATHAM, subject of the King of Great Britain and Ireland, and residing at "Odyong," Egecliffe Road, Woollahra, in the State of New South Wales, Commonwealth of Australia, have invented new and useful Improvements in Means for Automatically Recording in the Taximeter Extra Fares in Taxicabs, of which the following is a specification.

This invention is intended to act as a check upon the drivers of those public vehicles, plying for hire, known as taxi-cabs. At the present time, taxi-cabs are provided with a meter which automatically records the time or the distance traveled. Some of the taximeters also have dials upon which fares for additional passengers beyond two, may be exhibited, but these extra dials are operated by the driver, at the end of a journey, and are not automatic. Usually, the additional seats are of the collapsible or folding type, being raised or lowered as they are, or are not, required to be used.

It is the object of this invention to connect the additional seats to the taximeters so that, while the meter registers the main fares, the additional fares shall, at the same time, be automatically recorded, only when the additional seats are brought into use.

In order to give effect to the invention, but little alteration is required to be made in the construction of the taximeter, but auxiliary mechanism will be added to the main meter so that the additional fares may be automatically recorded, when required, at the same time as the main fares.

In different centers, the mode of charging additional fares varies but the auxiliary mechanism may be easily adapted to the varying conditions. In the city of Sydney, Australia, for instance, the rates for additional passengers are, for each additional person, one-third the rate for the two main passengers; in London, England, the present rate for each additional passenger is sixpence, no matter for how long a time or for how long a distance the passenger is carried.

There are many different types of taximeters in use on taxi-cabs, but it will be impossible to show the application of my invention to all the types; I have therefore selected, for purposes of illustration, the well-known "Aron" taximeter, and will show my invention adapted thereto.

The additional seats will be controlled by the driver; that is to say, an extra seat cannot be brought into use except it be released by the driver, but immediately it is released and lowered the auxiliary mechanism will be brought into play and the additional fare or fares will be exhibited and recorded in the manner and in conformity with the local transit regulations. The auxiliary mechanism may be added to an old meter, but with a new meter the additional mechanism may be constructed at the same time as, and be contained in the same casing as, the old mechanism.

In the "Aron" taximeter there is a main bent lever that operates the fare dial. This is the starting point of operation of the additional mechanism. When an additional seat is released by the driver, and made available for sitting upon, the auxiliary mechanism will be brought into play and the extra fare or fares recorded on a progressive basis, as in Sydney; but, at present, in London, other intermediate mechanism would be necessary, *i. e.*, when the seat is released and lowered, instantly, by any suitable intermediate appliances, the sum of sixpence will be at once, and unchangeably exhibited upon the auxiliary dials, in accordance with the local transit regulations.

The auxiliary mechanism is operated from the lower arm of the bent lever of the main meter by means of a pawl articulated to the lower part of the bent lever, such pawl engaging with a ratchet wheel to which an intermittent rotary motion is imparted by the pawl as the main bent lever reciprocates or moves back and forth. The rotary motion of the ratchet wheel is communicated, in any suitable manner, to the auxiliary fare dials, which, at present, are already installed in the meter. How this may be done is a matter of no importance, as many different methods may be adopted all of which will be merely mechanical equivalents the one of the other.

In the accompanying drawings, means are shown whereby the rotary movement of the ratchet shaft may be communicated automatically to the auxiliary dials at present installed in this type of meter; but the construction of the subsidiary mechanism adapted to transfer movement from the initial source to the exhibiting and recording dials is a matter of but little importance, providing always that the initial source of motion be connected automatically, by the unfolding movement of the additional seat, to the auxiliary mechanism that operates the extra fare dials.

In the accompanying drawings, none of the parts of the main taximeter are shown except such as will affect the working of the auxiliary apparatus, or are connected in some way therewith.

Figure 1 is a front view of some of the appliances in a taximeter that are used to give effect to the invention. Fig. 2 is a back or reverse view of the same. Fig. 3 is a semi diagrammatic view of the driver's seat and one of the extra additional seats, and the style or mode of connection that will be established between any extra seat, when down, and the auxiliary appliances connecting the seat with the extra seat dials. The driver's seat and one extra seat are shown on an enlarged scale. Fig. 4 is an end view of the auxiliary mechanism, on a slightly enlarged scale. Fig. 5 is a back view of the same, and is, in many respects, similar to parts of Fig. 2. Fig. 6 is a plan of Figs. 2 and 5 combined, but drawn to the scale of Fig. 5. Fig. 7 is an end view of the taximeter as seen from the left of Fig. 6, showing the totalizing recording dials and the means adopted to connect them with the extra fare dials. Fig. 8 is a full sized end view of the eccentrics and the pawls for working the auxiliary mechanism that operates the extra fare dials. Fig. 9 is a plan of the same.

A is the driver's seat, B a quick thread screw by which the driver can lock or unlock, the extra seat C in either the up or the down position. Every additional seat will be controlled by a similar device to that shown at B. A tail-piece $c$ on each additional seat will be connected by a suitable flexible appliance, such as the "Bowden wire" D, to a spring E in the meter frame. At the bottom of the spring is a washer flange $e$ which will rise or fall correspondingly with the movements of the tail $c$ of the seat C. Referring now specially to Figs. 2 and 5, alongside of the spring E are three transverse shafts F, G, H, at different elevations. On the upper shaft F is a pinion $f$ (Fig. 1), that gears with the corresponding spur wheel F', firmly secured to and working synchronously with the ratchet wheel $F^2$. The pinion $f$ is keyed on the shaft F, but the spur wheel F', ratchet $F^2$, and bell-cranks $g$—$g'$ can rotate freely upon the shaft G. On the shaft G are three bell-cranks, one arm of each of which $g$ is forked at the extreme end so as to pass around the springs E, the other arm $g'$ being formed as a pawl adapted to engage with a ratchet barrel $h$ upon the shaft H. The back of the pawl arm $g'$ of each bell-crank is formed with a hump $g^2$, so that when the flange $e$ of the spring E rises and engages the forked end of the arm $g$ of the bell-cranks, that arm will be raised until stopped by contact with the cross bar $g^3$; at the same time, the pawl arm $g'$ will be raised clear of the ratchet teeth of the ratchet barrel $h$ and, as it rises, it will lift the pawl J clear of the ratchet teeth of the ratchet $h$, thus putting the recording mechanism of that particular set out of gear. It should here be pointed out that if only one seat is down the ratchet $h$ will be advanced one tooth for every revolution of the transverse shaft F; if two seats are down, the ratchet $h$ will be advanced two teeth; if three seats are down the ratchet $h$ will be advanced three teeth for every revolution of the shaft F. How the connection is made, between the working parts, the fare dials and the recording dials will be hereinafter described.

On the transverse shaft F are three eccentrics J', $J^2$, $J^3$, (but cams with springs may be substituted therefor); to the eccentrics are strapped the pawls J that gear with the ratchet barrel $h$. The ratchet barrel $h$ extends across between the sides of the frame, so that each pawl J depending from the eccentrics J', $J^2$, $J^3$, shall be adapted to engage with it, and move it one, two, or three teeth for each revolution of the shaft F, as above explained. On the lowest transverse shaft H is an eccentric H', strapped to a connecting rod $H^2$ at the end of which is articulated a bell-crank $H^3$ the opposite end of which is articulated to a sliding piece $H^4$, which, as it rises and falls, will rock a small beam $H^5$, to the opposite end of which is articulated a pawl K that engages with a ratchet K' that causes the extra fare dials L to rotate intermittently and show the public the extra fare due. At the same time that the extra fare is exhibited on the extra fare dials L, a pawl $m$, articulated to the sliding piece $H^4$, will engage with a ratchet M on the same axis as the totalizing recording dials. These totalizing recording dials are in use at the present time, and when the driver operates the extra fare dials, the extra fare will be recorded upon the totalizing recording dials. With my invention, the total amount received from the passenger will be recorded by automatic action, instead of being dependent upon the driver ringing up the extra fare or fares.

Movement is conveyed to the main driving bent lever O (Fig. 1) of the taximeter, through the flexible shaft P that rotates a cam $p$ which, once in each revolution, will strike the antifriction roller $o$ thus conveying movement to the bent lever O. To the lower arm of the bent lever O is articulated a pawl Q that engages with the ratchet F² the rotary movement of which is communicated, through the spur wheel F' and pinion $f$, to the transverse shaft F, thence, through the eccentrics J', J², J³ and pawls J to the ratchet $h$ and the lowest shaft H, thence to the extra fare and totalizing recording dials, as previously explained. The initial pawl Q will be maintained in contact with the ratchet F² by the small spring $q$, or in any other appropriate manner.

Having thus described my invention, what I claim and desire to secure by patent is:—

1. In taxicabs, in combination, a taximeter, an extra seat mechanism for indicating and registering the extra fare on a progressive basis and means for automatically bringing said mechanism into action when said extra seat is moved from its inoperative to its operative position.

2. In taxicabs, in combination, a taximeter, an extra seat mechanism for indicating and registering the extra fare on a progressive basis comprising a ratchet barrel, an intermittently driven pawl adapted to actuate said barrel and means controlled by the lowering and raising of said extra seat to render said pawl operative or inoperative.

3. In taxicabs, in combination, a taximeter, a plurality of extra seats, mechanism for indicating and registering the extra fares on a progressive basis comprising a single ratchet barrel, a plurality of intermittently driven pawls adapted to actuate said barrel, there being one pawl associated with each extra seat and means controlled by the lowering and raising of each of said seats to render the pawl associated therewith operative or inoperative.

4. In taxicabs, in combination, a taximeter, a plurality of extra seats, mechanism for indicating and registering the extra fares on a progressive basis comprising a single ratchet barrel, a plurality of intermittently driven pawls adapted to actuate said barrel, there being one pawl associated with each extra seat, a shaft, said pawls being supported by sheaves eccentrically mounted on said shafts, means forming a part of said taximeter for intermittently rotating said shaft and means controlled by the lowering and raising of each of said seats to render the pawl associated therewith operative or inoperative.

In testimony whereof I have signed my name to this specification in the presence of two subscribing witnesses.

WILLIAM TATHAM.

Witnesses:
ALBERT MASSEY,
H. C. CAMPBELL.

---

Copies of this patent may be obtained for five cents each, by addressing the "Commissioner of Patents, Washington, D. C."